(12) United States Patent
Utaka et al.

(10) Patent No.: US 8,415,856 B2
(45) Date of Patent: Apr. 9, 2013

(54) ROTOR FOR ELECTRIC ROTATING MACHINE

(75) Inventors: Ryosuke Utaka, Takahama (JP); Tomokazu Hisada, Anjo (JP)

(73) Assignee: Denso Corporation, Kariya (JP)

( * ) Notice: Subject to any disclaimer, the term of this patent is extended or adjusted under 35 U.S.C. 154(b) by 106 days.

(21) Appl. No.: 13/080,899

(22) Filed: Apr. 6, 2011

(65) Prior Publication Data
US 2011/0248596 A1    Oct. 13, 2011

(30) Foreign Application Priority Data

Apr. 7, 2010 (JP) ................................ 2010-088517
Mar. 11, 2011 (JP) ................................ 2011-054296

(51) Int. Cl.
*H02K 1/06* (2006.01)
(52) U.S. Cl.
USPC .................................................. 310/216.136
(58) Field of Classification Search .................. 310/156.001–156.137
See application file for complete search history.

(56) References Cited

U.S. PATENT DOCUMENTS 3,260,875 A * 7/1966 Evans ..................... 310/216.136
3,802,068 A * 4/1974 Scott ................................ 29/598
4,085,347 A * 4/1978 Lichius .................... 310/216.065
4,114,019 A * 9/1978 Sandor ........................ 219/137 R
6,246,142 B1  6/2001 Asao et al.

FOREIGN PATENT DOCUMENTS

| JP | 6-86487 | 3/1994 |
| JP | 2000-278892 | 10/2000 |
| JP | 2004-350351 | 12/2004 |
| JP | 2006-353041 | 12/2006 |
| JP | 2009-11063 | 1/2009 |

* cited by examiner

*Primary Examiner* — Nguyen N Hanh
(74) *Attorney, Agent, or Firm* — Nixon & Vanderhye P.C.

(57) ABSTRACT

A rotor for an electric rotating machine includes a rotor core and a plurality of magnetic poles. The rotor core is formed of a plurality of magnetic steel sheets laminated in the axial direction of the rotor core. The magnetic poles are formed on a radially outer periphery of the rotor core. The magnetic poles are arranged at predetermined intervals in the circumferential direction of the rotor core so that the polarities of the magnetic poles alternate between north and south in the circumferential direction. Furthermore, the magnetic steel sheets forming the rotor core are welded so that a plurality of welds are formed on one of radially outer and inner surfaces of the rotor core. Each of the welds has a pair of axial end portions that are offset from each other in the circumferential direction of the rotor core and electrically connected to each other.

7 Claims, 10 Drawing Sheets (5TH MODIFICATION)

ROTOR FOR ELECTRIC ROTATING MACHINE

CROSS-REFERENCE TO RELATED APPLICATIONS

This application is based on and claims priority from Japanese Patent Applications No. 2010-88517 filed on Apr. 7, 2010 and No. 2011-54296 filed on Mar. 11, 2011, the contents of which are hereby incorporated by reference in their entireties into this application.

BACKGROUND

1. Technical Field

The present invention relates to rotors for electric rotating machines that are used in, for example, motor vehicles as electric motors and electric generators.

2. Description of Related Art

Japanese Patent Application Publication No. 2006-353041 discloses a rotor for an electric rotating machine. The rotor includes a rotor core, a plurality of permanent magnets, and a pair of annular end plates. The rotor core is formed by laminating a plurality of annular magnetic steel sheets in the axial direction of the rotor core. The permanent magnets are embedded in the rotor core so as to form a plurality of magnetic poles which are spaced in the circumferential direction of the rotor core at predetermined intervals and the polarities of which alternate between north and south in the circumferential direction. The end plates are respectively fixed on a pair of axial end faces of the rotor core.

With the above configuration, however, if the end plates are omitted from the rotor for cost reduction, during rotation of the rotor, the magnetic steel sheets may become separated from one another in the vicinities of radially outer peripheries of the axial end faces of the rotor core.

The above problem may be solved by welding the magnetic steel sheets as disclosed, for example, in Japanese Patent Application Publication No. H6-86487. More specifically, the magnetic steel sheets may be welded to form, on the radially outer surface of the rotor core, a plurality of welds each of which extends in the axial direction of the rotor core.

However, with the above formation of the welds, during operation of the electric rotating machine, for each of the welds, all parts of the weld will experience the same change in magnetic fluxes perpendicular to the axial direction of the rotor core at the same time. Consequently, a large eddy current will be induced in each of the welds, thereby considerably lowering the efficiency of the electric rotating machine.

SUMMARY

According to the invention, there is provided a rotor for an electric rotating machine. The rotor includes a rotor core and a plurality of magnetic poles. The rotor core is formed of a plurality of magnetic steel sheets laminated in the axial direction of the rotor core. The magnetic poles are formed on a radially outer periphery of the rotor core. The magnetic poles are arranged at predetermined intervals in the circumferential direction of the rotor core so that the polarities of the magnetic poles alternate between north and south in the circumferential direction. Furthermore, the magnetic steel sheets forming the rotor core are welded so that a plurality of welds are formed on one of radially outer and inner surfaces of the rotor core. Each of the welds has a pair of axial end portions that are offset from each other in the circumferential direction of the rotor core and electrically connected to each other.

With the above formation of the welds, during operation of the electric rotating machine, for each of the welds, the axial end portions of the weld will experience the same change in magnetic fluxes perpendicular to the axial direction of the rotor core at different times. Consequently, only a small eddy current will be induced in each of the welds, thereby making it possible to secure high efficiency of the electric rotating machine 1.

Preferably, each of the welds extends obliquely at a predetermined angle with respect to the axial direction of the rotor core.

Preferably, each of the welds extends for substantially half a magnetic pole pitch of the rotor in the circumferential direction of the rotor core.

It is preferable that for each of the welds, the axial end portions of the weld are respectively positioned within a circumferentially-adjacent pair of the magnetic poles which have different polarities.

Preferably, each of the welds is formed on at least one of a first axial end portion, an axial center portion, and a second axial end portion of the one of the radially outer and inner surfaces of the rotor core; the first and second axial end portions are respectively positioned on opposite axial sides of the axial center portion.

Each of the welds may extend continuously from one axial end to the other axial end of the one of the radially outer and inner surfaces of the rotor core.

The welds may be formed on the one of the radially outer and inner surfaces of the rotor core so as to adjoin one another in the circumferential direction of the rotor core; each adjoining pair of the welds may form a substantially "V" shape that opens toward one axial end of the one of the radially outer and inner surfaces of the rotor core.

Each of the welds may be comprised of a pair of first and second weld segments that are separated from each other; the first weld segment extends from one axial end of the one of the radially outer and inner surfaces of the rotor core while the second weld segment extends from the other axial end of the one of the radially outer and inner surfaces; the first and second segments overlap each other in the circumferential direction of the rotor core for a predetermined axial length within an axial center portion of the one of the radially outer and inner surfaces of the rotor core. Further, in this case, it is preferable that within the predetermined axial length, there is provided at least one of the magnetic steel sheets forming the rotor core.

Otherwise, each of the welds may be comprised of a plurality of weld segments that are separated from each other; for each of the welds, each adjacent pair of the weld segments of the weld overlap each other in the circumferential direction of the rotor core for a predetermined axial length. Further, in one embodiment, for each of the welds, all the weld segments of the weld each extend in the axial direction of the rotor core and are offset from one another in the circumferential direction of the rotor core. In another embodiment, for each of the welds, all the weld segments of the weld each extend obliquely at a predetermined angle with respect to the axial direction of the rotor core and overlap each other in the axial direction. Furthermore, it is preferable that within the predetermined axial length, there is provided at least one of the magnetic steel sheets forming the rotor core.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Figure 1:
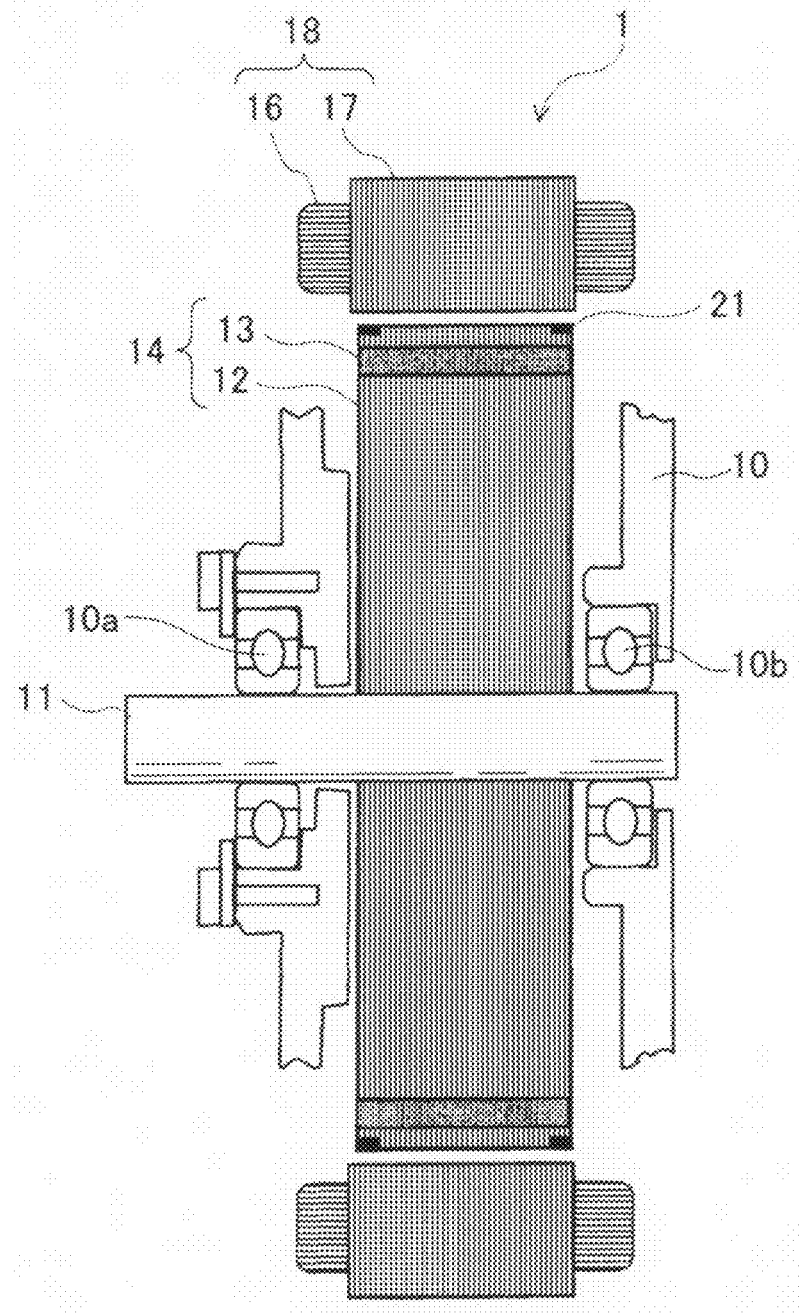
FIG. 1 is a schematic, partially cross-sectional view of an electric rotating machine which includes a rotor according to the first embodiment of the invention.

Preferred embodiments of the present invention will be described hereinafter with reference to FIGS. 1-18. It should be noted that for the sake of clarity and understanding, identical components having identical functions in different embodiments of the invention have been marked, where possible, with the same reference numerals in each of the figures and that for the sake of avoiding redundancy, descriptions of the identical components will not be repeated.

First Embodiment

FIG. 1 shows the overall configuration of an electric rotating machine 1 which includes a rotor 14 according to the first embodiment of the invention. The electric rotating machine 1 is configured to function both as an electric motor and as an electric generator in, for example, a hybrid or electric vehicle.

As shown in FIG. 1, the electric rotating machine 1 includes a housing 10 (only partially shown), a rotating shaft 11 that is rotatably supported by the housing 10 via a pair of bearings 10a and 10b, the rotor 14 that is fixed on the rotating shaft 11 and received in the housing 10, and a stator 18 that is held by the housing 10 and arranged in the housing 10 radially outside and coaxially with the rotor 14.

The stator 18 includes a hollow cylindrical stator core 17 and a three-phase stator coil 16.

The stator core 17 has a plurality of slots 17a (shown in FIG. 5) that is formed in the radially inner surface of the stator core 17 and spaced in the circumferential direction of the stator core 17. The stator core 17 is formed by laminating a plurality of annular magnetic steel sheets in the axial direction of the stator core 17.

The stator coil 16 is mounted on the stator core 17 so as to be partially received in the slots 17a of the stator core 17. The stator coil 16 is electrically connected to a three-phase inverter (not shown).

The rotor 14 includes a hollow cylindrical rotor core 12 and a plurality of permanent magnets 13.

Figure 5:
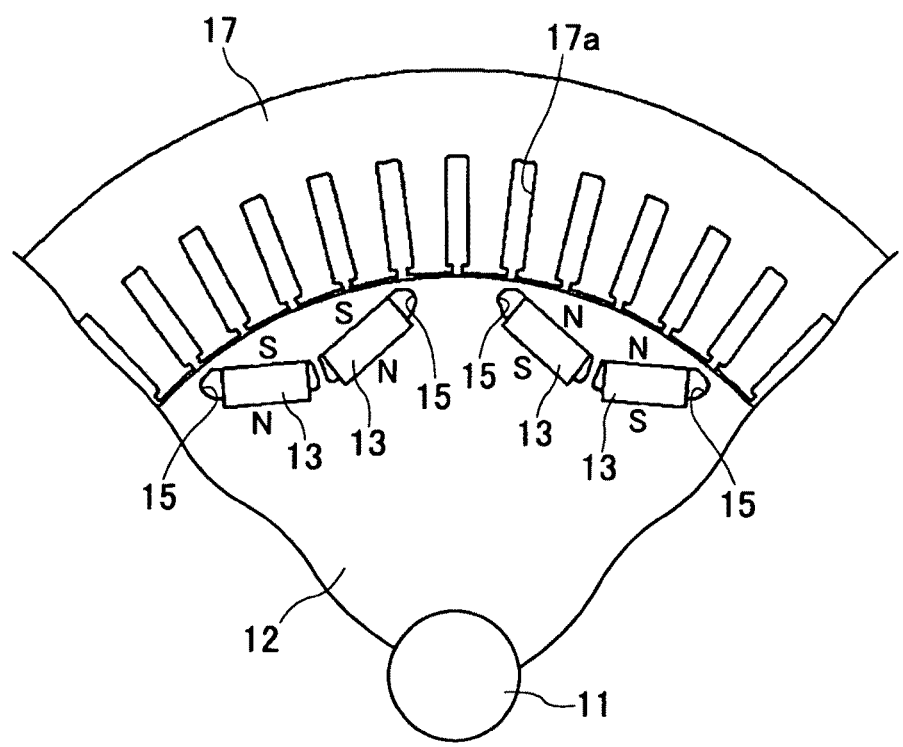
FIG. 5 is an axial end view of part of the electric rotating machine.

The rotor core 12 is coaxially fixed on the rotating shaft 11 so that the radially outer periphery of the rotor core 12 faces the radially inner periphery of the stator core 17 with a predetermined air gap formed therebetween (see FIG. 5). The rotor core 12 is formed by laminating a plurality of annular magnetic steel sheets in the axial direction of the rotor core 12.

Figure 2:
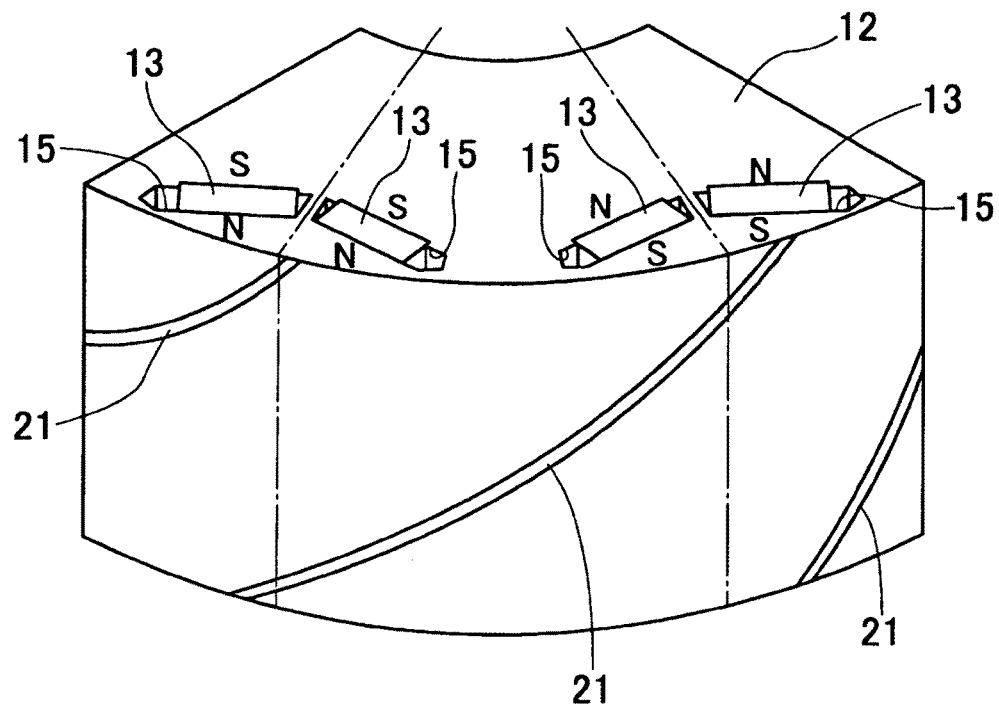
FIG. 2 is a perspective view of part of the rotor according to the first embodiment.

The permanent magnets 13 are embedded in the rotor core 12, as shown in FIG. 2, so as to form a plurality of magnetic poles on the radially outer periphery of the rotor core 12. The magnetic poles are arranged in the circumferential direction of the rotor core 12 at predetermined intervals so that the polarities of the magnetic poles alternate between north and south in the circumferential direction. In addition, the number of the magnetic poles is set to be equal to for example, eight (i.e., four north poles and four south poles) in the present embodiment.

Figure 3:
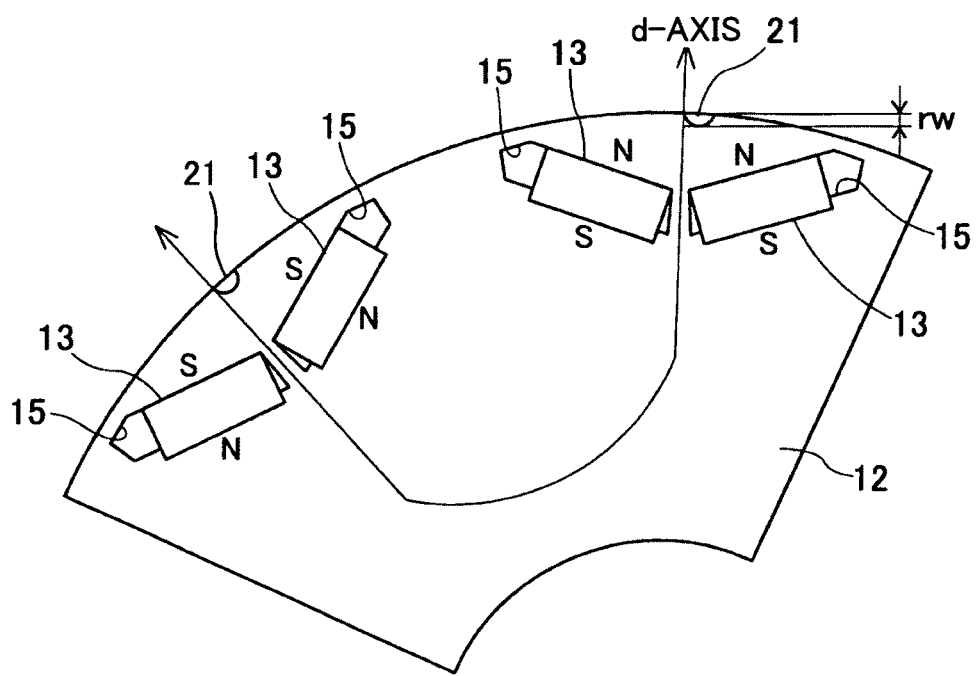
FIG. 3 is an axial end view of part of the rotor according to the first embodiment.

More specifically, referring to FIGS. 2 and 3, the rotor core 12 has eight pairs of through-holes 15 formed in the vicinity of the radially outer periphery of the rotor core 12. Each of the through-holes 15 extends in the axial direction of the rotor core 12. The eight pairs of the through-holes 15 are spaced in the circumferential direction of the rotor core at predetermined intervals. Moreover, each pair of the through-holes 15 is arranged to form a substantially "V" shape opening toward the radially outer periphery of the rotor core 12.

Each of the permanent magnets 13 is held in a corresponding one of the through-holes 15 of the rotor core 12 so as to extend in the axial direction of the rotor core 12. Moreover, for each pair of the through-holes 15 of the rotor core 12, the two permanent magnets 13 which are respectively held in the pair of the through-holes 15 are arranged so that the polarities (north or south) of the two permanent magnets 13 are the same on the radially outer side. Consequently, the permanent magnets 13 together form, on the radially outer periphery of the rotor core 12, a total of eight magnetic poles the polarities of which alternate between north and south in the circumferential direction of the rotor core 12. Moreover, for each of the magnetic poles, the d-axis extends between the two permanent magnets 13 which together form the magnetic pole so as to be equidistant from them.

In the present embodiment, as shown in FIGS. 2 and 3, the magnetic steel sheets forming the rotor core 12 are welded together so that on the radially outer surface of the rotor core 12, there are formed a plurality of welds 21 at a predetermined depth rw from the radially outer surface. Each of the welds 21 extends obliquely at a predetermined angle with respect to the axial direction of the rotor core 12. Moreover, each of the welds 21 extends continuously from one axial end to the other axial end of the radially outer surface of the rotor core 11. Consequently, for each of the welds 21, axial end portions of the weld 21 which are respectively positioned at the axial ends of the radially outer surface of the rotor core 12 are offset from each other in the circumferential direction of the rotor core 12 and electrically connected to each other.

Figure 4:
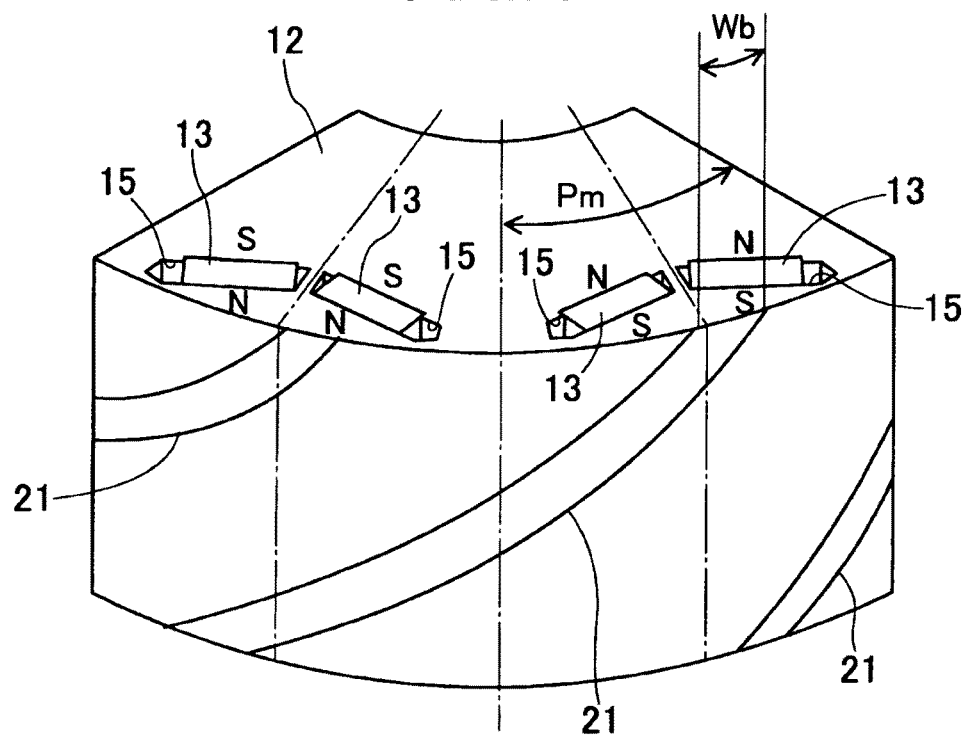
FIG. 4 is a perspective view illustrating the bead width of welds formed on the radially outer surface of a rotor core of the rotor according to the first embodiment.

Furthermore, in the present embodiment, each of the welds 21 is formed to extend for substantially half a magnetic pole pitch in the circumferential direction of the rotor core 12. Consequently, for each of the welds 21, the axial end portions of the weld 21 are respectively positioned within a circumferentially-adjacent pair of the magnetic poles which have different polarities. For example, for that one of the welds 21 which is centered in FIG. 2, one axial end portion (i.e., the upper end portion in FIG. 2) of the weld 21 is positioned within a South (S) magnetic pole while the other axial end portion (i.e., the lower end portion in FIG. 2) is positioned within a North (N) magnetic pole. Further, as shown in FIG. 4, the bead width Wb of the welds 21 is set to be less than half a magnetic pole pitch Pm of the rotor core 12, so as to allow each of the axial end portions of the welds 21 to be positioned within the corresponding magnetic pole. In addition, the number of the welds 21 is equal to the number of the magnetic poles (i.e., eight) in the present embodiment.

After having described the overall configuration of the rotor 14 according to the present embodiment, the advantages thereof will be described hereinafter.

In the present embodiment, the magnetic steel sheets forming the rotor core 12 are welded together so that the welds 21 are formed on the radially outer surface of the rotor core 12. For each of the welds 21, the axial end portions of the weld 21 are offset from each other in the circumferential direction of the rotor core 12. Moreover, the axial end portions are also electrically connected to each other because the weld 21 extends continuously between them.

With the above formation of the welds 21, during operation of the electric rotating machine 1, for each of the welds 21, the axial end portions of the weld 21 will experience the same change in magnetic fluxes perpendicular to the axial direction of the rotor core 12 at different times. Consequently, only a small eddy current will be induced in each of the welds 21, thereby making it possible to secure high efficiency of the electric rotating machine 1.

Further, in the present embodiment, each of the welds 21 is formed to extend obliquely at the predetermined angle with respect to the axial direction of the rotor core 12.

With the above formation of the welds 21, during operation of the electric rotating machine 1, for each of the welds 21, all parts of the weld 21 experience the same change in magnetic fluxes perpendicular to the axial direction of the rotor core 12 at different times. Consequently, it is possible to effectively suppress the induction of eddy current in each of the welds 21, thereby more is reliably securing high efficiency of the electric rotating machine 1.

Moreover, in the present embodiment, each of the welds 21 is formed to extend for substantially half a magnetic pole pitch of the rotor 14 in the circumferential direction of the rotor core 12.

With the above formation of the welds 21, during operation of the electric rotating machine 1, for each of the welds 21, the directions of eddy currents induced in the axial end portions of the weld 21 are opposite to each other. Consequently, the eddy current induced in one of the axial end portions will be at least partially canceled by that induced in the other axial end portion. As a result, it is possible to effectively suppress the total amount of eddy currents induced in each of the welds 21, thereby reliably securing high efficiency of the electric rotating machine 1.

Further, in the present embodiment, for each of the welds 21, the axial end portions of the weld 21 are respectively positioned within a circumferentially-adjacent pair of the magnetic poles which have different polarities.

With the above arrangement, during operation of the electric rotating machine 1, for each of the welds 21, the eddy current induced in one of the axial end portions of the weld 21 will be almost completely canceled by that induced in the other axial end portion. As a result, it is possible to suppress the total amount of eddy currents induced in each of the welds 21 almost to zero, thereby more reliably securing high efficiency of the electric rotating machine 1.

In the present embodiment, each of the welds 21 is formed to extend continuously from one axial end to the other axial end of the radially outer surface of the rotor core 12.

With the above formation, each of the welds 21 joins all the magnetic steel sheets forming the rotor core 12. Consequently, it is possible to securely join all the magnetic steel sheets together, thereby reliably preventing them from being separated from one another during operation of the electric rotating machine 1.

In addition, in the present embodiment, each of the welds 21 extends to obliquely cross an imaginary plane which includes the d-axis passing through the center of the corresponding magnetic pole.

In general, on the d-axis, the magnetic field is strong and it is thus easy for a large eddy current to be induced. However, with the above formation of the welds 21, the induced large eddy current can be effectively dissipated via the corresponding weld 21.

First Modification

Figure 6:
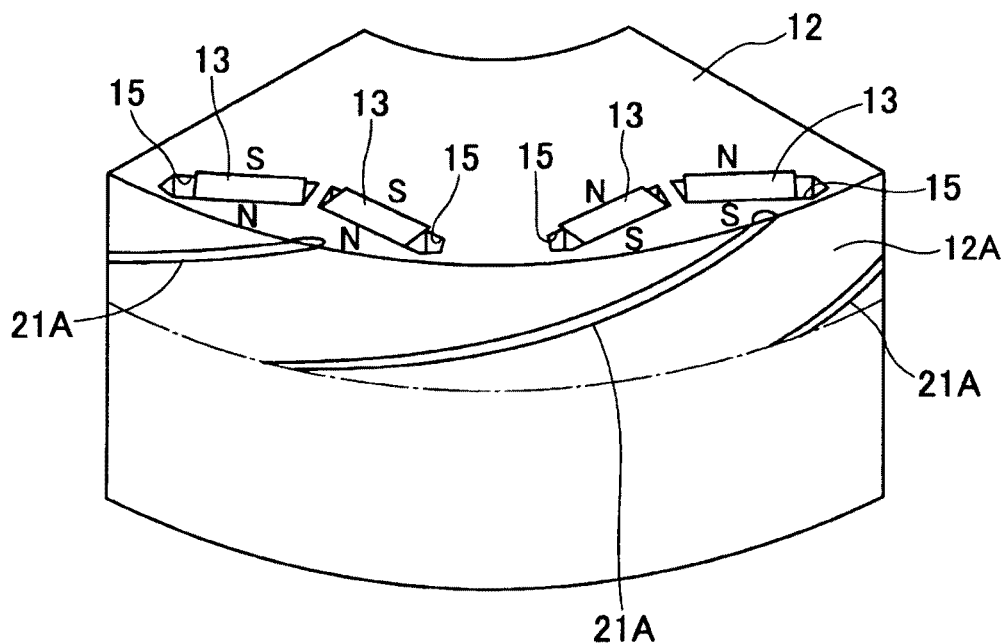
FIG. 6 is a perspective view of part of a rotor according to the first modification to the first embodiment.

Referring to FIG. 6, in this modification, there are formed a plurality of welds 21A only on a first axial end portion 12A (i.e., an upper end portion 12A in FIG. 6) of the radially outer surface of the rotor core 12. Each of the welds 21A extends obliquely at a predetermined angle with respect to the axial direction of the rotor core 12. Moreover, each of the welds 21A extends continuously for substantially half a magnetic pole pitch in the circumferential direction of the rotor core 12.

Second Modification

Figure 7:
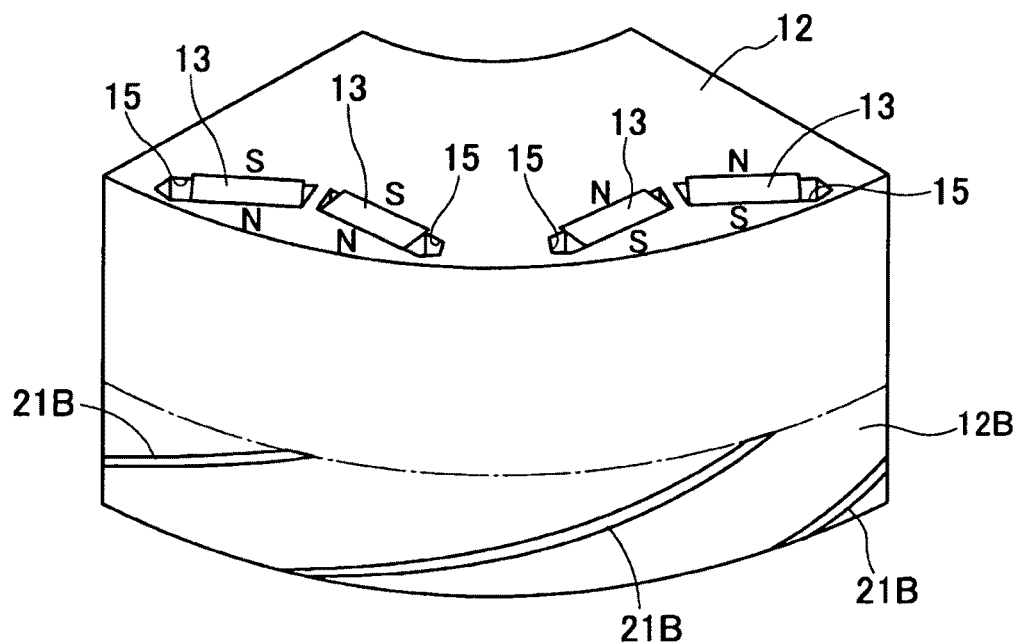
FIG. 7 is a perspective view of part of a rotor according to the second modification to the first embodiment.

Referring to FIG. 7, in this modification, there are formed a plurality of welds 21B only on a second axial end portion 12B (i.e., a lower end portion 12B in FIG. 7) of the radially outer surface of the rotor core 12. Each of the welds 21B extends obliquely at a predetermined angle with respect to the axial direction of the rotor core 12. Moreover, each of the welds 21B extends continuously for substantially half a magnetic pole pitch in the circumferential direction of the rotor core 12.

Third Modification

Figure 8:
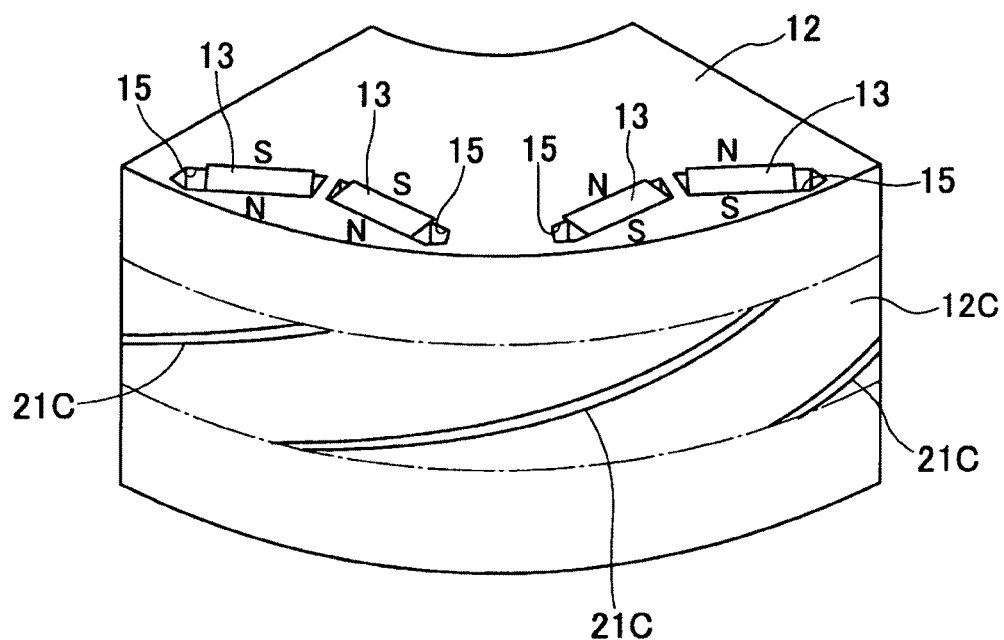
FIG. 8 is a perspective view of part of a rotor according to the third modification to the first embodiment.
Figure 9:
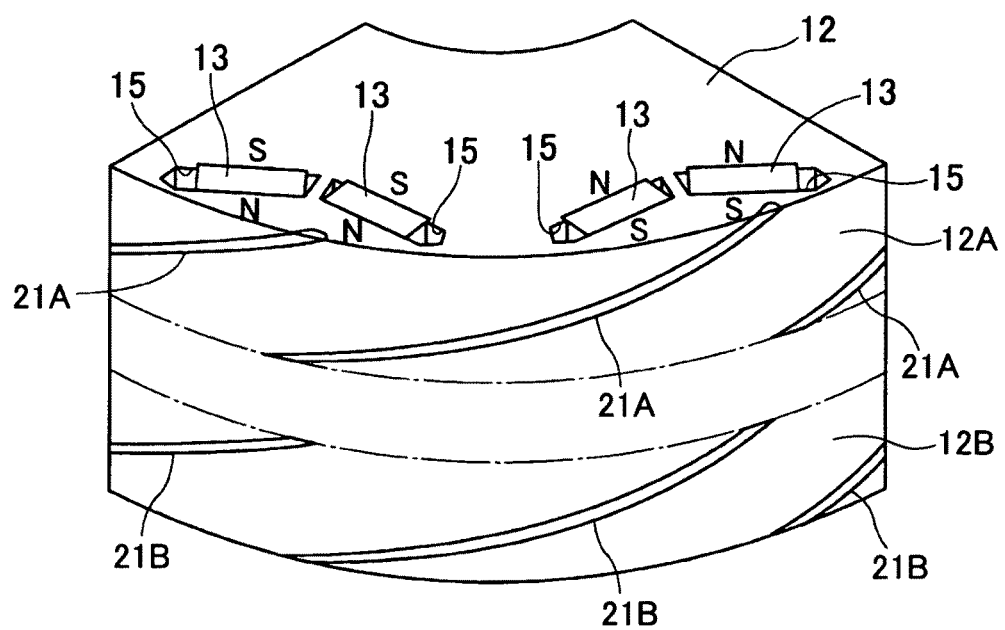
FIG. 9 is a perspective view of part of a rotor according to the fourth modification to the first embodiment.

Referring to FIG. 8, in this modification, there are formed a plurality of welds 21C only on an axial center portion 12C of the radially outer surface of the rotor core 12. Each of the welds 21C extends obliquely at a predetermined angle with respect to the axial direction of the rotor core 12. Moreover, each of the welds 21C extends continuously for substantially half a magnetic pole pitch in the circumferential direction of the rotor core 12.

Fourth Modification

This modification is a combination of the first and second modifications. More specifically, referring to FIG. 9, in this modification, there are formed the welds 21A only on the first axial end portion 12A of the radially outer surface of the rotor core 12 and the welds 21B only on the second axial end portion 12B of the radially outer surface of the rotor core 12. Each of the welds 21A and 21B extends obliquely at the predetermined angle with respect to the axial direction of the rotor core 12. Moreover, each of the welds 21A and 21B extends continuously for substantially half a magnetic pole pitch in the circumferential direction of the rotor core 12.

In addition, the welds 21A can be formed at the same time as the welds 21B, thereby improving the productivity.

Fifth Modification

Figure 10:
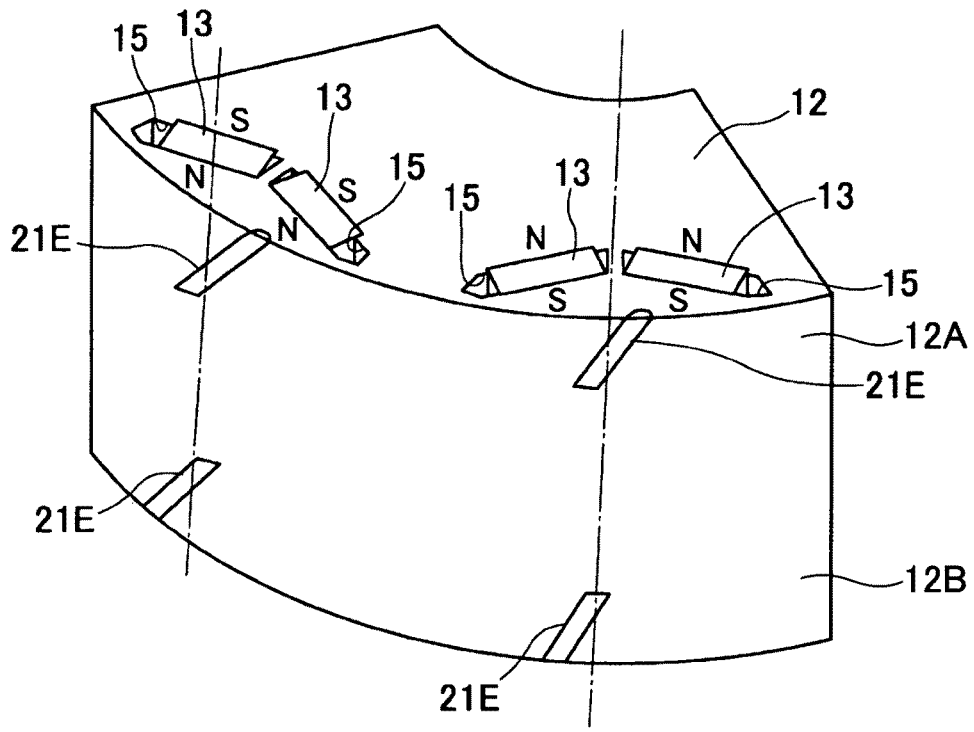
FIG. 10 is a perspective view of part of a rotor according to the fifth modification to the first embodiment.

Referring to FIG. 10, in this modification, there are formed a plurality of welds 21E only on the first and second axial end portions 12A and 12B of the radially outer surface of the rotor core 12. Each of the welds 21E extends obliquely at a predetermined angle with respect to the axial direction of the rotor core 12. However, the extending length of the welds 21E is much smaller than that of the welds 21A and 21B according to the fourth modification.

More specifically, in the fourth modification, each of the welds 21A and 21B extends continuously for substantially half a magnetic pole pitch in the circumferential direction of the rotor core 12. In comparison, in the present modification, each of the welds 21E extends within only a limited area around the d-axis passing through the center of the corresponding magnetic pole so as to obliquely cross an imaginary plane which includes the d-axis.

With the above formation of the welds 21E according to the present modification, it is still possible to improve the efficiency of the electric rotating machine 1.

Figure 11A:
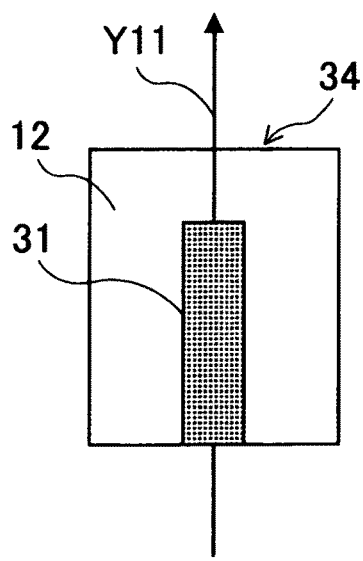
FIG. 11A is a schematic view illustrating the formation of welds on the radially outer surface of a rotor core according to the prior art.
Figure 11B:
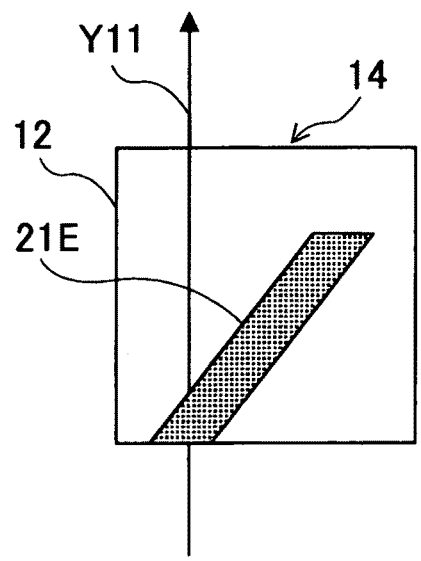
FIG. 11B is a schematic view illustrating the formation of welds on the radially outer surface of a rotor core according to the fifth modification.

FIG. 11A illustrates the formation of welds 31 according to the prior art disclosed, for example, in Japanese Patent Application Publication No. H6-86487. FIG. 11B illustrates the formation of the welds 21E according to the present modification.

As shown in FIG. 11A, according to the prior art, the magnetic steel sheets forming the rotor core 12 are welded so that on the radially outer surface of the rotor core 12, there are formed a plurality of welds 31 each of which extends in the axial direction Y11 of the rotor core 12. Consequently, during operation of the electric rotating machine, for each of the welds 31, all parts of the weld 31 will experience the same change in magnetic fluxes perpendicular to the axial direction Y11 at the same time. As a result, a large eddy current will be induced in each of the welds 31.

In comparison, as shown in FIG. 11B, according to the present modification, each of the welds 21E is formed to extend obliquely at the predetermined angle with respect to the axial direction Y11 of the rotor core 12. Consequently, during operation of the electric rotating machine 1, for each of the welds 21E, all parts of the weld 21E will experience the same change in magnetic fluxes perpendicular to the axial direction Y11 at different dines. As a result, a small eddy current will be induced in each of the welds 21.

Figure 12:
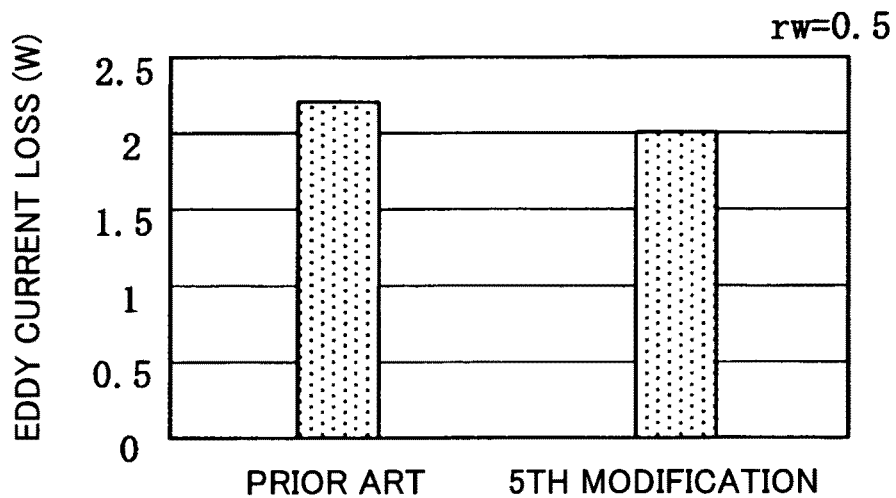
FIG. 12 is a graphical representation giving comparison in eddy current loss between the rotor according to the prior art and the rotor according to the fifth modification.

FIG. 12 gives a comparison in eddy current loss between the rotor 34 according to the prior art and the rotor 14 according to the present modification.

As shown in FIG. 12, the eddy current loss occurring in the rotor 34 according to the prior art is about 2.2 W, while the eddy current loss occurring in the rotor 14 according to the present modification is about 2 W. Consequently, the efficiency of the electric rotating machine 1 according to the present modification is improved in comparison with that of the electric rotating machine according to the prior art. In addition, both the depth rw of the welds 31 according to the prior art and the depth rw of the welds 21E according to the present modification are set to 0.5 mm.

Moreover, in the present modification, each of the welds 21E is formed to obliquely cross an imaginary plane which includes the d-axis passing through the center of the corresponding magnetic pole. In general, on the d-axis, the magnetic field is strong and it is thus easy for a large eddy current to be induced. However, with the above formation of the welds 21E, the induced large eddy current can be effectively dissipated via the corresponding weld 21E.

In addition, it should be noted that each of the welds 21E may also be formed to extend without crossing the imaginary plane which includes the d-axis.

Sixth Modification

Figure 13:
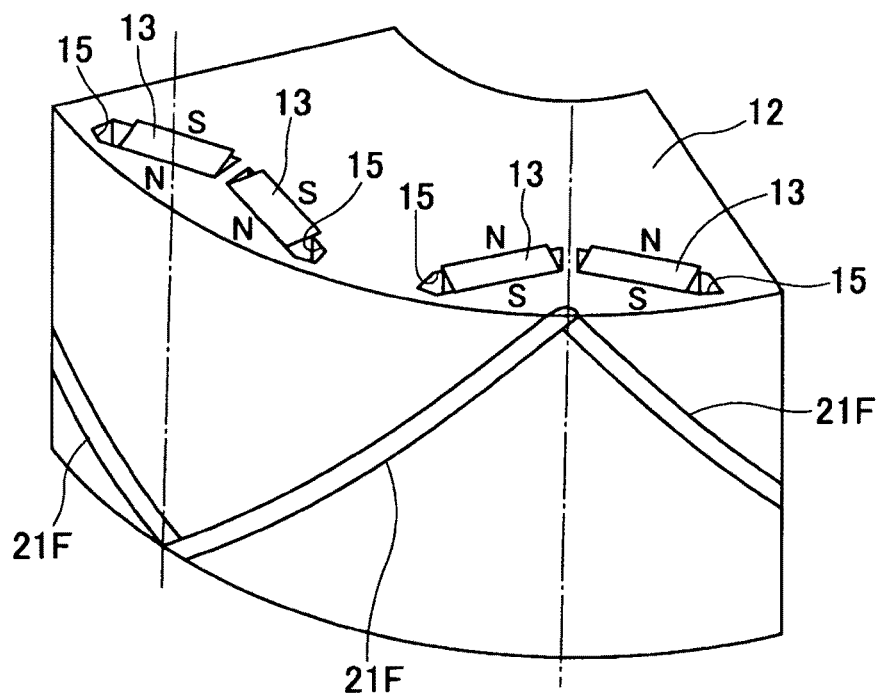
FIG. 13 is a perspective view of part of a rotor according to the sixth modification to the first embodiment.

Referring to FIG. 13, in this modification, on the radially outer surface of the rotor core 12, there are formed a plurality of welds 21F each of which extends obliquely at a predetermined angle with respect to the axial direction of the rotor Core 12. Moreover, each of the welds 21F extends continuously from one axial end to the other axial end of the radially outer surface of the rotor core 12.

Furthermore, the welds 21F adjoin one another in the circumferential direction of the rotor core 12 so that each adjoining pair of the welds 21F forms a substantially "V" shape that opens at one of the axial ends of the radially outer surface of the rotor core 12 and is closed at the other axial end.

In addition, each of the welds 21F is formed to extend for substantially half a magnetic pole pitch in the circumferential direction of the rotor core 12.

Second Embodiment

Figure 14:
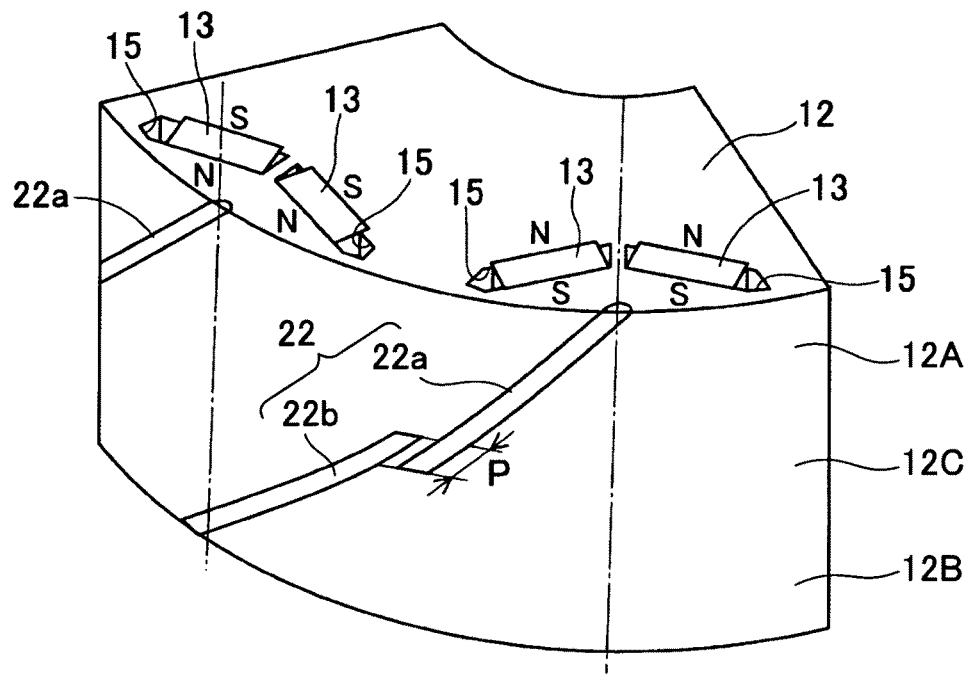
FIG. 14 is a perspective view of part of a rotor according to the second embodiment of the invention.

Referring to FIG. 14, in this embodiment, the magnetic steel sheets forming the rotor core 12 are welded together to form a plurality of welds 22 on the radially outer surface of the rotor core 12. Each of the welds 22 is comprised of a pair of first and second weld segments 22a and 22b that are separated from each other. The first weld segment 22a extends, on both the entire first axial end portion 12A and part of the axial center portion 12C of the radially outer surface of the rotor core 12, obliquely at a predetermined angle with respect to the axial direction of the rotor core 12. The second weld segment 22b extends, on both the entire second axial end portion 12B and part of the axial center portion 12C of the radially outer surface of the rotor core 12, obliquely at the same predetermine angle as the first weld segment 22a with respect to the axial direction of the rotor core 12. The first and second weld segments 22a and 22b are arranged to overlap each other in the circumferential direction of the rotor core 12 for a predetermined axial length P within the axial center portion 12C of the radially outer surface of the rotor core 12. Moreover, within the predetermined axial length P, there is provided at least one of the magnetic steel sheets forming the rotor core 12. Consequently, the first and second weld segments 12a and 12b are electrically connected to each other via the at least one of the magnetic steel sheets.

Furthermore, in the present embodiment, each of the welds 22 is formed to extend for substantially half a magnetic pole pitch in the circumferential direction of the rotor core 12. Consequently, for each of the welds 22, the axial end portions of the weld 22 are respectively positioned within a circumferentially-adjacent pair of the magnetic poles which have different polarities. For example, for that one of the welds 22 which is centered in FIG. 14, one axial end portion of the weld 22 (i.e., the upper end portion of the first weld segment 22a in FIG. 14) is positioned within a South (S) magnetic pole while the other axial end portion of the weld 22 (i.e., the lower end portion of the second weld segment 22b in FIG. 14) is positioned within a North (N) magnetic pole. Accordingly, in the present embodiment, there are a total of eight welds 22 arranged along the circumferential direction of the rotor core 12.

With the above formation of the welds 22 according to the present embodiment, it is possible to achieve the same advantages as with the formation of the welds 21 according to the first embodiment.

Moreover, with the above formation of the welds 22, it is possible to perform the process of welding the magnetic steel sheets from both the axial ends of the rotor core 12 at the same time, thereby improving the productivity.

Third Embodiment

Figure 15:
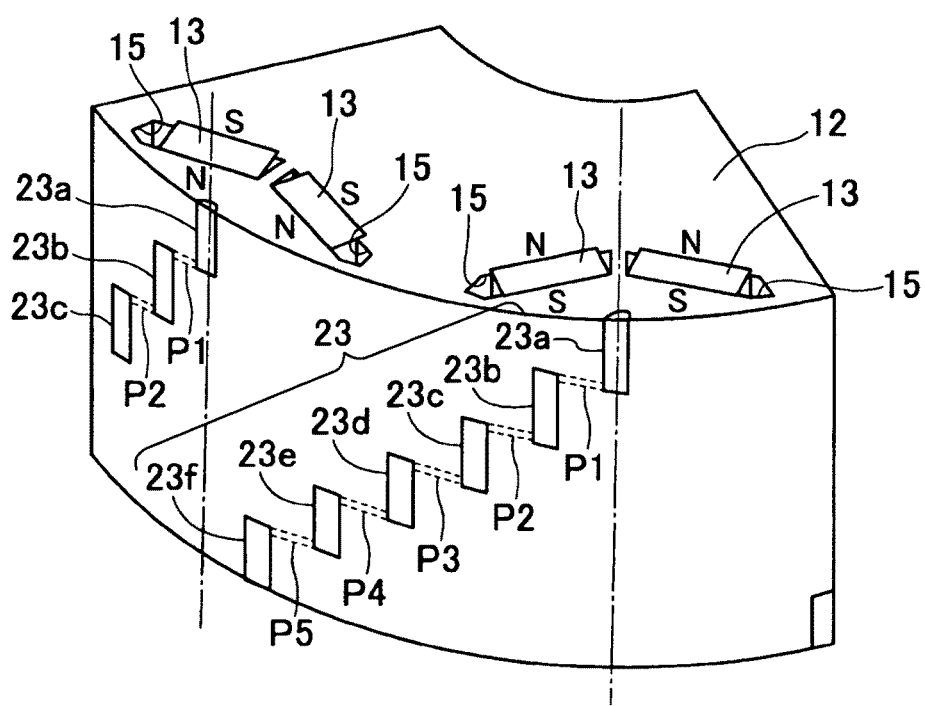
FIG. 15 is a perspective view of part of a rotor according to the third embodiment of the invention.

Referring to FIG. 15, in this embodiment, the magnetic steel sheets forming the rotor core 12 are welded together to form a plurality of welds 23 on the radially outer surface of the rotor core 12. Each of the welds 23 is comprised of first to sixth weld segments 23a-23f that are separated from each other. Each of the weld segments 23a-23f extends in the axial direction of the rotor core 12, and all the lengths of the weld segments 23a-23f are set to be equal. Moreover, for each of the welds 23, each adjacent pair of the weld segments 23a-23f overlap each other in the circumferential direction of the rotor core 12 for a predetermined axial length. Furthermore, all the weld segments 23a-23f are offset from each other in the circumferential direction of the rotor core 12.

For example, for that one of the welds 23 which is centered in FIG. 15, the first weld segment 23a is located to have an end thereof positioned at the upper end of the radially outer surface of the rotor core 12 and on the d-axis passing through the center of one South (5) magnetic pole of the rotor 14. The second weld segment 23b is offset from the first weld segment 23a both leftward and downward; the second weld segment 23b overlaps the first weld segment 23a in the circumferential direction of the rotor core 12 for a predetermined axial length P1. The third weld segment 23c is offset from the second weld segment 23b both leftward and downward; the third weld segment 23c overlaps the second weld segment 23b in the circumferential direction of the rotor core 12 for a predetermined axial length P2. The fourth weld segment 23d is offset from the third weld segment 23c both leftward and downward; the fourth weld segment 23d overlaps the third weld segment 23c in the circumferential direction of the rotor core 12 for a predetermined axial length P3. The fifth weld segment 23e is offset from the fourth weld segment 23d both leftward and downward; the fifth weld segment 23e overlaps the fourth weld segment 23d in the circumferential direction of the rotor core 12 for a predetermined axial length P4. The sixth weld segment 23f is offset from the fifth weld segment 23e both leftward and downward so as to have an end thereof positioned at the lower end of the radially outer surface of the rotor core 12 and close to the d-axis passing through the center of one North (N) magnetic pole of the rotor 14; the sixth weld segment 23f overlaps the fifth weld segment 23e in the circumferential direction of the rotor core 12 for a predetermined axial length P5.

Moreover, within each of the predetermined axial lengths P1-P5, there is provided at least one of the magnetic steel sheets forming the rotor core 12. Consequently, all the weld segments 23a-23f are electrically connected to one another via the magnetic steel sheets arranged within the predetermined axial lengths P1-P5.

Furthermore, in the present embodiment, each of the welds 23 is formed to extend over almost one magnetic pole pitch in the circumferential direction of the rotor core 12. Consequently, for each of the welds 23, the axial end portions of the weld 23 are respectively positioned within a circumferentially-adjacent pair of the magnetic poles which have different polarities. For example, for that one of the welds 23 which is centered in FIG. 15, one axial end portion of the weld 23 (i.e., the first weld segment 23a in FIG. 15) is positioned within a South (5) magnetic pole while the other axial end portion of the weld 23 (i.e., the sixth weld segment 23f in FIG. 15) is positioned within a North (N) magnetic pole. Accordingly, in the present embodiment, there are a total of eight welds 23 arranged along the circumferential direction of the rotor core 12.

With the above formation of the welds 23 according to the present embodiment, it is possible to achieve the same advantages as with the formation of the welds 21 according to the first embodiment.

Moreover, with the above formation of the welds 23, it is possible to perform the process of welding the magnetic steel sheets from a plurality of axial positions of the rotor core 12 at the same time, thereby improving the productivity.

In addition, it is also possible to the welds 23 so that each of the weld segments 23a-23f extends obliquely at a predetermined angle with respect to the axial direction of the rotor core 12. In this case, the length of each of the weld segments 23a-23f can be increased, thereby allowing the sixth weld segment 23f to be positioned further close to the d-axis passing through the center of the North (N) magnetic pole.

Fourth Embodiment

Figure 16:
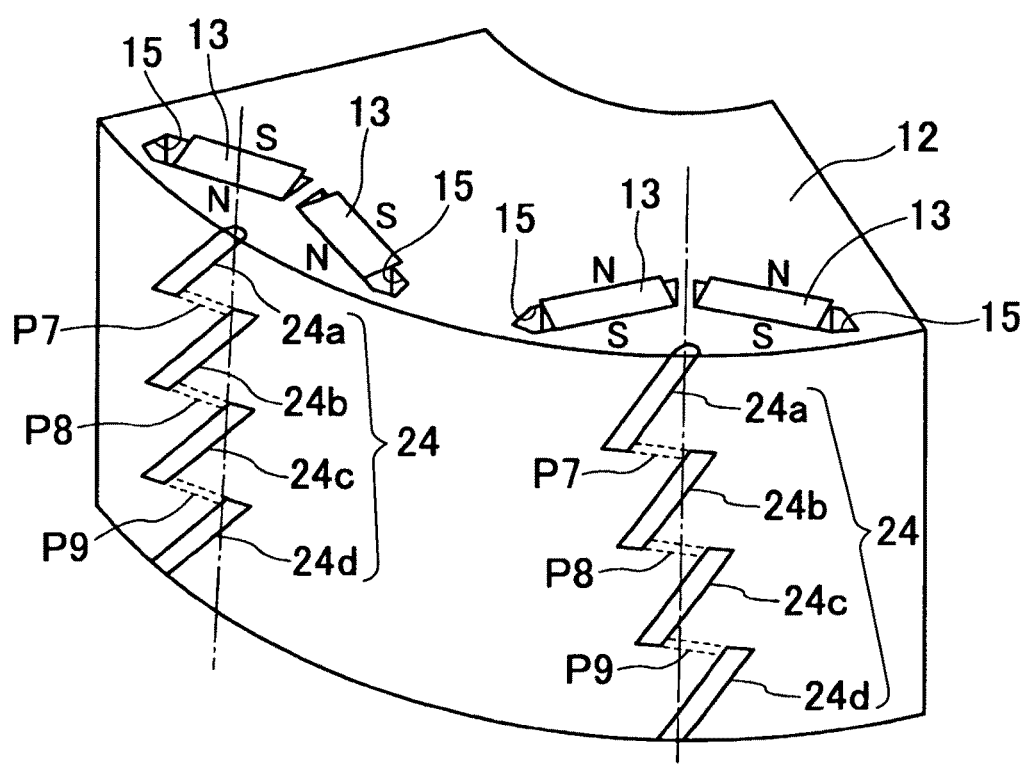
FIG. 16 is a perspective view of part of a rotor according to the fourth embodiment of the invention.

Referring to FIG. 16, in this embodiment, the magnetic steel sheets forming the rotor core 12 are welded together to form a plurality of welds 24 on the radially outer surface of the rotor core 12. Each of the welds 24 is comprised of first to fourth weld segments 24a-24d that are separated from each other. Each of the weld segments 24a-24d extends obliquely at a predetermined angle with respect to the axial direction of the rotor core 12; all the lengths of the weld segments 24a-24d are set to be equal. Moreover, for each of the welds 24, each adjacent pair of the weld segments 24a-24f overlap each other in the circumferential direction of the rotor core 12 for a predetermined axial length.

More specifically, for each of the welds 24, the first weld segment 24a is located to have an end thereof positioned at one axial end (i.e., the upper end in FIG. 16) of the radially outer surface of the rotor core 12. The second weld segment 24b is offset from the first weld segment 24a both rightward and downward; the second weld segment 24b overlaps the first weld segment 24a in the circumferential direction of the rotor core 12 for a predetermined axial length P7. The third weld segment 24c is offset from the second weld segment 24b both rightward and downward; the third weld segment 24c overlaps the second weld segment 24b in the circumferential direction of the rotor core 12 for a predetermined axial length P8. The fourth weld segment 24d is offset from the third weld segment 24c both rightward and downward so as to have an end thereof positioned at the other axial end (i.e., the lower end in FIG. 16) of the radially outer surface of the rotor core 12; the fourth weld segment 24d overlaps the third weld segment 24c in the circumferential direction of the rotor core 12 for a predetermined axial length P9.

Moreover, within each of the predetermined axial lengths P7-P9, there is provided at least one of the magnetic steel sheets forming the rotor core 12. Consequently, all the weld segments 24a-24d are electrically connected to one another via the magnetic steel sheets arranged within the predetermined axial lengths P7-P9.

Furthermore, in the present embodiment, for each of the welds 24, all the weld segments 24a-24d overlap each other in the axial direction of the rotor core 12. Further, all the weld segments 24a-24d are arranged to obliquely cross an imaginary plane which includes the d-axis passing through the center of a corresponding one of the magnetic poles. Accordingly, in the present embodiment, there are a total of eight welds 24 arranged along the circumferential direction of the rotor core 12.

With the above formation of the welds 24 according to the present embodiment, it is possible to achieve the same advantages as with the formation of the welds 21 according to the first embodiment.

Moreover, with the above formation of the welds 24, it is possible to perform the process of welding the magnetic steel sheets from a plurality of axial positions of the rotor core 12 at the same time, thereby improving the productivity.

In addition, for each of the welds 24, since all the weld segments 24a-24d are arranged to obliquely cross the imaginary plane which includes the d-axis passing through the center of the corresponding magnetic pole, it is possible to effectively dissipate the large eddy current induced around the d-axis via the weld segments 24a-24d.

While the above particular embodiments and modifications have been shown and described, it will be understood by those skilled in the art that various further modifications, changes, and improvements may be made without departing from the spirit of the invention.

For example, in the previous embodiments, the number of the welds formed on the radially outer surface of the rotor core 12 is set to eight. However, it is also possible to form a different number of welds not less than two on the radially outer surface of the rotor core 12.

Moreover, in the previous embodiments, the rotor 14 is a permanent magnet-type rotor. However, the invention may also be applied to other types of rotors for electric rotating machines, such as a reluctance-type rotor.

In the previous embodiments, the rotor 14 is an inner-type rotor which is located radially inside the stator 18; the welds are accordingly formed on the radially outer surface of the rotor core 12.

Figure 17:
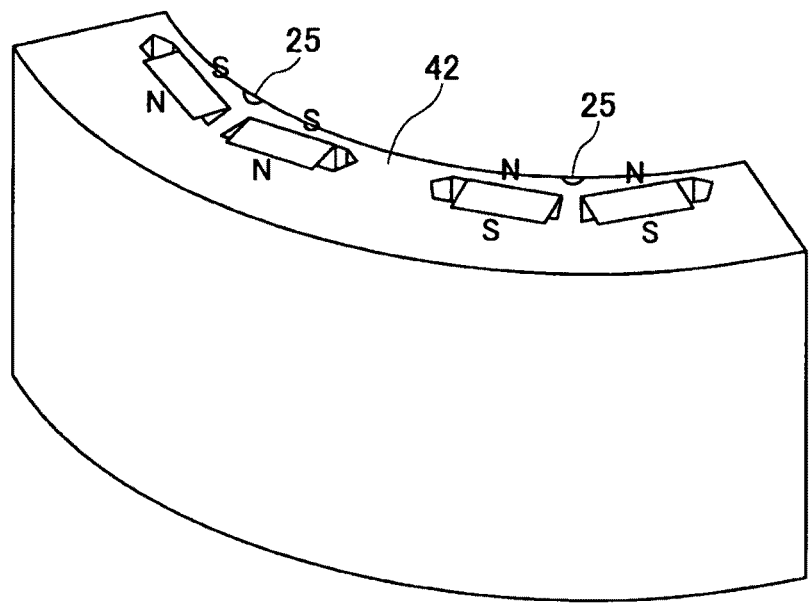
FIGS. 17 and 18 are perspective views of part of a rotor according to a further modification of the invention respectively from the radially outside and radially inside of the rotor.
Figure 18:
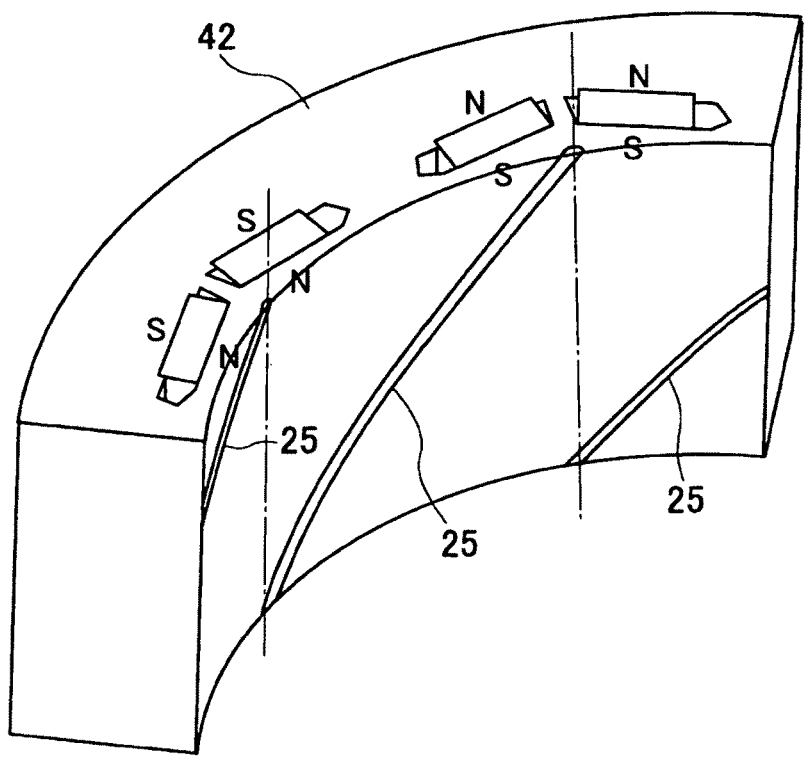

However, the invention may also be applied to an outer-type rotor which is located radially outside a stator. In this case, as shown in FIGS. 17 and 18, the magnetic steel sheets forming the rotor core 42 of the outer-type rotor may be welded together to form a plurality of welds 25 on the radially inner surface of the rotor core 42. Each of the welds 25 extends obliquely at a predetermined angle with respect to the axial direction of the rotor core 42. Moreover, each of the welds 25 extends continuously from one axial end to the other axial end of the radially inner surface of the rotor core 42. Furthermore, each of the welds 25 extends for substantially half a magnetic pole pitch in the circumferential direction of the rotor core 42 so that a pair of axial end portions of the weld 25 are respectively positioned within a circumferentially-adjacent pair of the magnetic poles which have different polarities.

In the previous embodiments, the rotor 14 includes no end plates. However, the rotor 14 may further include a pair of end plates that are respectively fixed on the axial end faces of the rotor core 12. Moreover, in this case, it is preferable to weld the end plates together with the magnetic steel sheets forming the rotor core 12.

What is claimed is:

1. A rotor for an electric rotating machine, the rotor comprising:
   a rotor core that is formed of a plurality of magnetic steel sheets laminated in an axial direction of the rotor core; and
   a plurality of magnetic poles formed on a radially outer periphery of the rotor core, the magnetic poles being arranged at predetermined intervals in a circumferential direction of the rotor core so that polarities of the magnetic poles alternate between north and south in the circumferential direction,
   wherein
   the magnetic steel sheets forming the rotor core are welded so that a plurality of welds are formed on one of radially outer and inner surfaces of the rotor core,
   each of the welds has a pair of axial end portions that are offset from each other in the circumferential direction of the rotor core and electrically connected to each other,
   the welds are formed on the one of the radially outer and inner surfaces of the rotor core so as to adjoin one another in the circumferential direction of the rotor core, and
   each adjoining pair of the welds forms a substantially "V" shape that opens toward one axial end of the one of the radially outer and inner surfaces of the rotor core.

2. A rotor for an electric rotating machine, the rotor comprising:
   a rotor core that is formed of a plurality of magnetic steel sheets laminated in an axial direction of the rotor core; and
   a plurality of magnetic poles formed on a radially outer periphery of the rotor core, the magnetic poles being arranged at predetermined intervals in a circumferential direction of the rotor core so that polarities of the magnetic poles alternate between north and south in the circumferential direction,
   wherein
   the magnetic steel sheets forming the rotor core are welded so that a plurality of welds are formed on one of radially outer and inner surfaces of the rotor core, and
   each of the welds has a pair of axial end portions that are offset from each other in the circumferential direction of the rotor core and electrically connected to each other,
   each of the welds is comprised of a pair of first and second weld segments that are separated from each other,
   the first weld segment extends from one axial end of the one of the radially outer and inner surfaces of the rotor core while the second weld segment extends from the other axial end of the one of the radially outer and inner surfaces, and
   the first and second segments overlap each other in the circumferential direction of the rotor core for a predetermined axial length within an axial center portion of the one of the radially outer and inner surfaces of the rotor core.

3. The rotor as set forth in claim 2, wherein within the predetermined axial length, there is provided at least one of the magnetic steel sheets forming the rotor core.

4. A rotor for an electric rotating machine, the rotor comprising:
- a rotor core that is formed of a plurality of magnetic steel sheets laminated in an axial direction of the rotor core; and
- a plurality of magnetic poles formed on a radially outer periphery of the rotor core, the magnetic poles being arranged at predetermined intervals in a circumferential direction of the rotor core so that polarities of the magnetic poles alternate between north and south in the circumferential direction, wherein the magnetic steel sheets forming the rotor core are welded so that a plurality of welds are formed on one of radially outer and inner surfaces of the rotor core, and each of the welds has a pair of axial end portions that are offset from each other in the circumferential direction of the rotor core and electrically connected to each other, each of the welds is comprised of a plurality of weld segments that are separated from each other, and for each of the welds, each adjacent pair of the weld segments of the weld overlap each other in the circumferential direction of the rotor core for a predetermined axial length.

5. The rotor as set forth in claim 4, wherein for each of the welds, all the weld segments of the weld each extend in the axial direction of the rotor core and are offset from one another in the circumferential direction of the rotor core.

6. The rotor as set forth in claim 4, wherein for each of the welds, all the weld segments of the weld each extend obliquely at a predetermined angle with respect to the axial direction of the rotor core and overlap each other in the axial direction.

7. The rotor as set forth in claim 4, wherein within the predetermined axial length, there is provided at least one of the magnetic steel sheets forming the rotor core.

\* \* \* \* \*